Oct. 14, 1941.                W. L. MAYNE                2,259,387
                                VALVE
                          Filed Aug. 16, 1939

INVENTOR.
Walter L. Mayne.
BY Murray Sackhoff & Paddack.
ATTORNEYS.

Patented Oct. 14, 1941

2,259,387

UNITED STATES PATENT OFFICE 2,259,387

VALVE

Walter L. Mayne, Fredonia, N. Y., assignor to Marsh Valve Company, Dunkirk, N. Y., a corporation of New York Application August 16, 1939, Serial No. 290,442

1 Claim. (Cl. 137—69)

The present invention relates to adjustable orifice valves for use in warm water heating systems or in any other installation demanding accurate theoretical and practical adjustment of temperature values based on rate of fluid flow, and has for an object the provision of an inexpensive, compact and easily manipulated valve for such purposes.

Another object of the invention is to provide in an adjustable orifice valve a means to facilitate practical and accurate checking and adjustment of theoretical settings of such valves without increasing the size of any of the parts.

Another object of the invention is to provide a valve having a normally concealed thermometer well having no communication with the fluids within the valve body but arranged for heat transmission only and therein so disposed as to provide a most accurate check on the temperature of fluid passing therethrough.

These and other objects are attained by the means described herein and exemplified in the accompanying drawing, in which.

In various systems and apparatus the accurate control of the amount of fluid passed at a given point in such system is a vital factor in the effectiveness of the system or apparatus. Where the temperature of the fluid is an important factor, as in the balancing of a warm water heating system, the accurate adjustment becomes vital and many difficulties have attended the designing and balancing of such systems. Accurate calculations of pipe sizes and radiator sizes by the warm water heating engineer cannot be put into practice because the multiplicity of theoretical sizes are not commercially available. The system utilizing either thermal or mechanical circulation must, however, be balanced to assure a proper flow of the water through each radiator unit if the system is to function properly. The task of balancing a system has heretofore been a very tedious one.

By the means of the present invention the previous difficulties are eliminated to the extent that a system may be installed using convenient sizes of piping and radiator units with valves of the present invention initially set to provide the theoretically correct flow of water from the return ends of all radiators and a single accurate thermometer check of the system in operation will thereupon make it possible to easily make all necessary practical adjustments at the valve to assure perfect balance of the system.

While the invention is herein exemplified in an angle valve, it is to be understood that it is not restricted to this particular form of valve.

Figure 5:
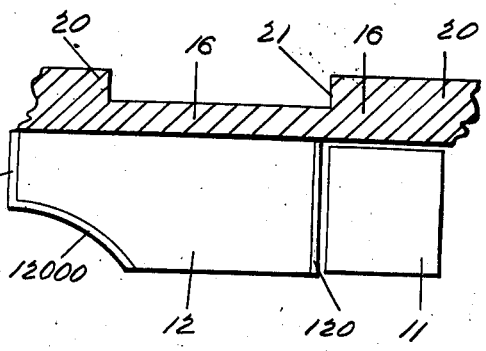
Fig. 5 is a schematic view showing a development of the orificing cylinder with a development of the orifice boundaries of the valve body superposed thereon in the relative full open position of the valve.
Figure 4:
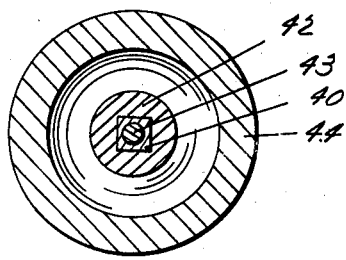
Fig. 4 is a view taken on line 4—4 of Fig. 3.

In general, the device of the invention comprises a valve body 10 with a relatively square flow orifice 11 that is accurately controlled as to size or effective flow orifice area by a valve cylinder 12 which is rotatably adjusted by a valve stem 13. The bonnet portion 14 of the body 10 is desirably integral with the body and has on its inside wall a stop lug 15. The orificing or flow regulating valve cylinder 12 has a disc shaped top wall 16 with an angular seat 17 receiving a complementary shaped end 18 of stem 13 and any suitable means such as screw 19 serves to fix the parts together. On the top of disc 16 is an arcuate complementary lug 20 having an end 21 which abuts lug 15 to stop rotation on the cylinder in one direction when the cylinder fully closes the rectangular orifice 11 in the valve body. Lugs 15 and 20 limit movement of orificing cylinder 12 to about one third of a revolution between fully opened and fully closed positions. This is clearly shown in Fig. 5. The cylinder 12 is cut on a straight sharp edge 120 to provide full opening coinciding with orifice 11 in the valve body and is further cut away for a lesser distance at 1200 and on a curve 12,000 around the circumference of the cylinder to provide a sharp shearing edge to follow the inside of the valve body to prevent the accumulation of sediment.

As will be hereinafter fully explained, means are provided to externally indicate the size of the effective flow orifice at any setting of the orificing cylinder 12, and furthermore, a cooperating means is provided exteriorly of the valve to accurately adjust the limit of opening movement of the valve. The indicating means is graduated in tenths and, therefore, with a known and accurately formed orifice 11 in the valve and the accurately formed orificing cylinder, it is possible to set the valve to provide a required theoretically calculated orifice size between zero and maximum capacity of the valve. With the valves of the invention it is possible to quickly effect a theoretical balance of a warm water heating system by the initial adjustment of the valves, regardless of the fact that the theoretical pipe sizes were not available. The practical balancing of the system by the use of test thermometers is also simplified and is effected more rapidly and accurately than heretofore by the provision of a normally closed thermometer well disposed in the valve operating stem of each valve. It is amongst the special objects of the invention to provide an easily obtained and very accurate temperature reading of the return flow of warm water as it leaves each radiator well. This is accomplished without enlarging the valve but nevertheless with greater speed and accuracy than heretofore possible, and directly within the valve whereby the corrective fractional adjustments are made, if required.

Figure 1:
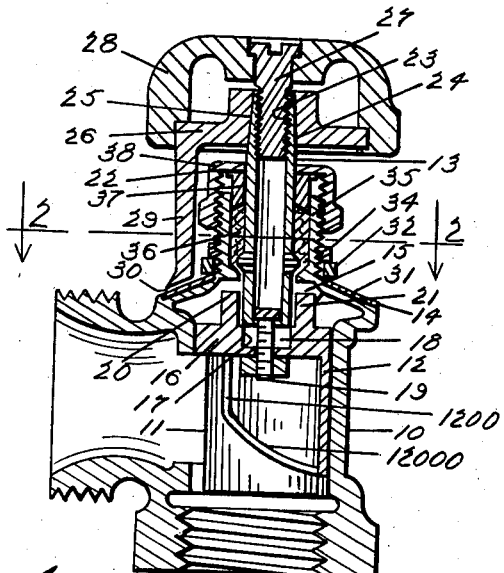
Fig. 1 is a vertical cross sectional view through a valve embodying the invention.
Figure 2:
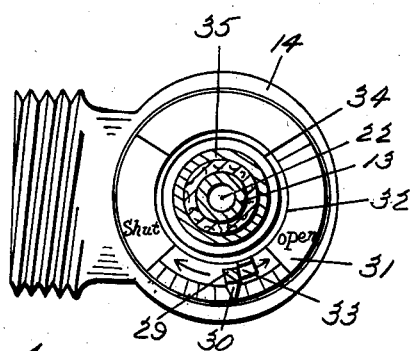
Fig. 2 is a horizontal sectional view through the valve of Fig. 1 and taken on line 2—2 of Fig. 1.

In the embodiment of the invention herein exemplified, the valve stem 13 has a bore or thermometer well 22, the wall of which is internally threaded at 23 for a distance from the open top end. The exterior top end of stem 13 is squared and tapered at 24 to provide for the seating of the complementarily shaped opening in the stem actuating member 26. It will be seen that the valve stem wall is quite thin at the top in order to provide ample diameter for the well 22 and without increasing the size of the stem. A threaded member 27 is provided for removable insertion in the threaded portion 23 in order to strengthen the stem wall and also to close the thermometer well. In the embodiment illustrated in Fig. 1, the screw 27 also serves to secure the valve stem operating member 26 and the handle grip 28 to the stem 13. The handle grip 28 is suitably recessed in its lower face to frictionally receive the top portion of stem operating member 26. The member 26 has a depending finger 29 with a pointer 30 which rides over indicator ring plate 31 that is fixed on top of bonnet portion 14.

As the cylinder 12, stem 13 and operating member 26 move as a unit relative to the orifice 11 in the valve body and the plate 31 on the body, the position of the cylinder is indicated by said pointer 30 and ring plate 31 at any instant in terms of area of effective orifice opening. For example, if the rectangular orifice 11 has an area of 1 square inch and the cylinder is moved by the stem to the sixth graduation away from the "shut" or closed position, then the effective opening will be six tenths of 1 square inch. The means for establishing this or any other selected opening as the permanent full open position of the valve comprises a stop ring 32 seated over the plate 31 and having a lug 33 to stop movement of finger 29. The stop ring encircles the neck of the valve body and is adjusted to non-rotatable selected positions with respect to the graduations on the dial plate 31 by seating it on the base of the neck 35. The stop ring 32 may be raised and adjusted to a different position when desired by first unscrewing the externally knurled and internally threaded locking ring 34 that is threadedly mounted on the threaded neck 35 of the valve. The parts are closely machined for metal to metal non-leaking seating both in the cylinder and body, and in the stem and bonnet. The usual packing, gland and locknut indicated at 36, 37 and 38, respectively, are employed to supplement the leak proof arrangement of the parts.

Figure 3:
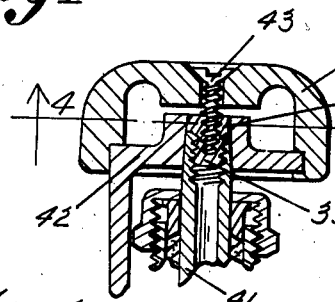
Fig. 3 is a vertical sectional view showing a modified form of strengthening and well-closing member embodying the invention.

In the modified form of strengthening and well closing means shown in Fig. 3 a screw threaded plug 39 has a squared tapered section 40 which serves as a continuation of the taper on the valve stem 41 and the seat in the actuating member 42 fits over both the stem and the tapered head section 40 of said plug 39. An ordinary screw 43 passes through the handle grip or wheel member 44 for joining the parts together.

The rotary valve is desirably made of non-corrosive metals and is unlikely to stick or bind because of the sharp edges 120, 1200 and 12,000. In the hands of experienced installing workmen, the closing plug or screw may be removed without removing the handle grip or stem operating means and the necessary fine adjustments may be made by such workmen while the strengthening member is removed.

When the fully adjusted and assembled valves are used by building occupants as ordinary shut off valves to control individual radiator units, the thermometer wells are closed and concealed and the stems are reinforced for routine hard usage by the closing means.

It is to be understood that the handle grip pieces 28 and 44 are formed of a suitable material of low heat conductivity and that the invention herein is not limited to devices in which such parts are included since the actuating means as a whole may be modified according to desired design and construction within the spirit of the invention and the scope of the appended claim.

What is claimed is:

In combination a valve body having an inlet opening and a relatively rectangular outlet orifice, an exteriorly threaded hollow neck at the top of said body, a rotary orifice control member in the body having its top spaced below the bottom of the neck and having a stem receiving opening in its top, a hollow thin-walled stem including a short, solid bottom end portion of reduced cross-section secured in the opening in the top of the said control member for turning said control member, said hollow thin-walled stem extending upwardly through and above said neck and having reduced cross-section at the top exterior portion thereof, a dial plate fixed on the valve body at the base of the neck, a stop ring adjustably seating in non-rotatable relation on the dial plate at the base of the neck, an externally knurled lock ring threadedly carried by the neck for releasably retaining the stop ring against movement from its seating position, a stem actuator having an opening shaped to seat on the reduced exterior top portion of said valve stem, and further having a depending indicator finger shiftable over the dial plate as the stem is turned by said actuator, a handle grip seating on said actuator, the valve stem being of uniform inside diameter to receive a thermometer substantially to the top of the orifice control member, the interior of the valve stem being in non-communicating relation with the interior of the valve body and its neck, a screw threadedly entering the open top of the valve stem to secure the grip and actuator to the stem, and stem packing means including a packing nut seated over the threaded neck at its upper part and permitting independent operation of the locking ring.

WALTER L. MAYNE.